US009386550B2

(12) United States Patent
Becker (10) Patent No.: US 9,386,550 B2
(45) Date of Patent: Jul. 5, 2016

(54) TANDEM SATELLITE FRAME SYNCHRONIZATION

(71) Applicant: ViaSat, Inc., Carlsbad, CA (US)

(72) Inventor: Donald W. Becker, Rancho Santa Fe, CA (US)

(73) Assignee: VIASAT INC., Carlsbad, CA (US)

( * ) Notice: Subject to any disclaimer, the term of this patent is extended or adjusted under 35 U.S.C. 154(b) by 362 days.

(21) Appl. No.: 13/830,838

(22) Filed: Mar. 14, 2013

(65) Prior Publication Data

US 2013/0329630 A1 Dec. 12, 2013

Related U.S. Application Data

(60) Provisional application No. 61/658,278, filed on Jun. 11, 2012, provisional application No. 61/658,265, filed on Jun. 11, 2012.

(51) Int. Cl.
*H04H 20/28* (2008.01)
*H04H 20/74* (2008.01)
*H04W 56/00* (2009.01)
*H04B 7/185* (2006.01)

(52) U.S. Cl.
CPC ........ *H04W 56/0015* (2013.01); *H04B 7/18513* (2013.01)

(58) Field of Classification Search
CPC .................... H04W 56/0015; H04W 72/0446; H04B 7/18513; H04B 7/7125
USPC .......................................................... 370/326
See application file for complete search history.

(56) References Cited

U.S. PATENT DOCUMENTS

| 2004/0140930 | A1* | 7/2004 | Harles | G01S 5/14 342/387 |
| 2006/0030351 | A1* | 2/2006 | Miller | H04B 7/18513 455/522 |
| 2007/0155317 | A1* | 7/2007 | Monte | H04B 7/18567 455/12.1 |
| 2009/0092122 | A1* | 4/2009 | Czaja | H04L 7/041 370/350 |
| 2010/0195564 | A1* | 8/2010 | Jong | H04B 7/18513 370/326 |
| 2010/0309828 | A1* | 12/2010 | Nguyen | H04B 7/18539 370/281 |

* cited by examiner

*Primary Examiner* — Andrew Chriss
*Assistant Examiner* — Voster Preval
(74) *Attorney, Agent, or Firm* — Marsh Fischmann & Breyfogle LLP; Daniel J. Sherwinter (57) ABSTRACT

Systems and methods are described synchronizing communications frames and their respective time slots for satellite communications architectures having multiple satellites in the same orbital slot in such a way that addresses inter-satellite inter-beam interference. In some embodiments, the first and second satellites communicate with a respective number of ground terminals (e.g., gateway and user terminals) according to first and second satellite time slots, respectively. The satellites maintain relative positions in their orbital slot to manifest a maximum path delay difference between first and second path delays, the first path delay being between the first ground terminals and the first satellite, and the second path delay being between the first ground terminals and the second satellite. A synchronization system can offset the first satellite time slots from the second satellite time slots as a function of the maximum path delay difference.

21 Claims, 8 Drawing Sheets

TANDEM SATELLITE FRAME SYNCHRONIZATION

CROSS-REFERENCES TO RELATED APPLICATIONS

This application claims the benefit of and is a non-provisional of co-pending U.S. Provisional Application Ser. No. 61/658,265, filed on Jun. 11, 2012, titled "OPERATION OF TWO BEAM SWITCHING SATELLITES IN THE SAME ORBITAL SLOT"; and co-pending U.S. Provisional Application Ser. No. 61/658,278, filed on Jun. 11, 2012, titled "INTERFERENCE MANAGEMENT OF TWO BEAM SWITCHING SATELLITES IN THE SAME ORBITAL SLOT," both of which are hereby expressly incorporated by reference in their entirety for all purposes.

FIELD

Embodiments relate generally to satellite communications systems, and, more particularly, to synchronization of communications frames and their respective time slots for architectures having multiple satellites in an orbital slot.

BACKGROUND

A satellite communications system typically includes a constellation of one or more satellites that links ground terminals (e.g., gateway terminals and user terminals). For example, the gateway terminals provide an interface with a network such as the Internet or a public switched telephone network, and each gateway terminal services a number of user terminals located in one or more spot beams. With ground terminals geographically dispersed, different spot beams can experience different path delays to the satellites. When overlapping and potentially interfering spot beams are serviced by multiple satellites in the same orbital slot, the path delay differences can contribute additional sources of interference.

BRIEF SUMMARY

Among other things, systems and methods are described for synchronizing communications frames and their respective time slots for satellite communications architectures having multiple satellites in the same orbital slot in such a way that addresses inter-satellite inter-beam interference.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Satellite communications systems that switch among large numbers of beams can use various techniques in an attempt to minimize potential conflicts between interfering beams. For example, overlapping (e.g., adjacent or more appreciably overlapping) beams operating in the same spectrum and polarity can interfere with one another, causing various issues. Some of these conflicts can be avoided using techniques, such as geographic distribution of beams, different polarities and/or frequencies on adjacent beams, beam switching, etc. Still, potential conflicts arise. The potential conflicts can be appreciably greater in satellite architectures having multiple satellites in a single orbital slot. It can be difficult or impractical to synchronize beam switching between the two satellites to reduce beam conflicts. For example, shifting relative positions of the satellites in the orbital slot can manifest as changing path delays between any ground terminal and the satellites, which can tend to shift relative communication timing between the satellites from the perspective of ground terminals and add de-conflicting complexity.

Embodiments synchronize communications frames and their respective time slots for satellite communications architectures having multiple satellites in the same orbital slot in such a way that addresses inter-satellite inter-beam interference. For example, two satellites communicate with respective ground terminals according to respective time slots. The satellites can maintain relative positions in their orbital slot to manifest a maximum path delay difference between first and second path delays, the first path delay being between the first ground terminals and the first satellite, and the second path delay being between the first ground terminals and the second satellite. A synchronization system can offset the first satellite time slots from the second satellite time slots as a function of the maximum path delay difference (e.g., by one half of a time slot). As described herein, this can mitigate potential conflicts.

Figure 1:
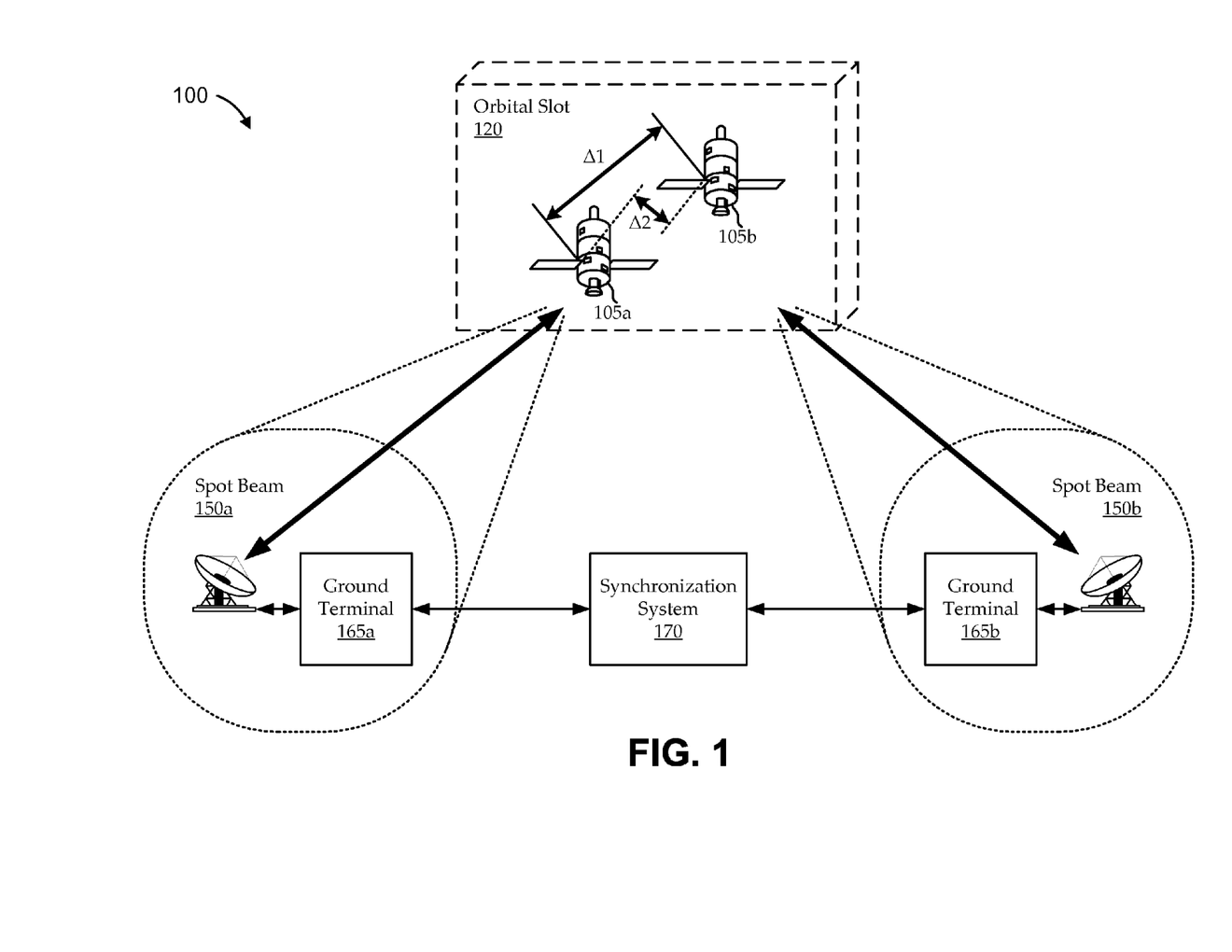
FIG. 1 shows a block diagram of an embodiment of a satellite communications system having two satellites in a single orbital slot, according to various embodiments.

Turning first to FIG. 1, a block diagram is shown of an embodiment of a satellite communications system 100 having two satellites 105 in a single orbital slot 120, according to various embodiments. While the satellites 105 are described as being in the same orbital slot 120, similar techniques can be applied to satellites that are not technically in the same orbital slot 120 but are sufficiently close to each other to manifest potential interference issues, like those described herein. The satellite communications system 100 includes a number of ground terminals 165 that communicate via the satellites 105 over spot beams 150. For example, the ground terminals 165 include gateway terminals and user terminals that communicate via the satellites 105 according to any suitable communications architecture, such as a hub-spoke architecture. In some implementations, some ground terminals 165 are in substantially fixed locations (e.g., at a residential or enterprise subscriber's premises), and other ground terminals 165 are mobile terminals. Further, the term "ground" is used herein generally in contrast to the portions of the network in "space" (i.e., the satellites 105). For example, embodiments of the ground terminals can include mobile aircraft terminals and the like.

Some embodiments include a number of ground terminals 165 configured as gateway terminals or hubs. Gateway terminals can perform various functions, such as scheduling traffic to user terminals, synchronizing communications with one or more satellites 105, coding and/or modulation (and decoding and/or de-modulation) of traffic to and from the satellite 105, etc. Though not shown, embodiments also include core nodes or other systems. For example, geographically distributed core nodes are in communication with the public and/or private networks (e.g., the Internet), with multiple gateway terminals (e.g., redundantly), and with each other via a high-speed, high-throughput, high-reliability terrestrial backbone network. The core nodes can perform enhanced routing, queuing, scheduling, and/or other functionality. In some implementations, some or all of the core nodes perform functionality of the synchronization system 170. The various ground segment components (e.g., ground terminals 165, synchronization system 170, etc.) can be communicatively coupled via any suitable type of network, for example, an Internet Protocol (IP) network, an intranet, a wide-area network (WAN), a local-area network (LAN), a virtual private network (VPN), a public switched telephone network (PSTN), a public land mobile network, a cellular network, and/or other wired, wireless, optical, or other types of links.

Each ground terminal 165 can have an antenna that includes a reflector with high directivity in the direction of the satellite 105 and low directivity in other directions. The antennas can be implemented in a variety of configurations and can include features, such as high isolation between orthogonal polarizations, high efficiency in the operational frequency bands, low noise, and the like. In one embodiment, a user terminal and its associated antenna together comprise a very small aperture terminal (VSAT) with the antenna measuring about 0.75 meters in diameter and having about 2 watts of transmit power. In other embodiments, a variety of other types of antennas are used to communicate with the satellite 105. Each antenna is configured to communicate with the satellite 105 via a spot beam 150 (e.g., a fixed-location beam). For example, each antenna points at the satellite 105 and is tuned to a particular carrier (and/or polarization, etc.). The satellite 105 can include one or more fixed directional antennas for reception and transmission of signals. For example, a directional antenna includes a fixed reflector with one or more feed horns for each spot beam. Typically, the satellite communications system 100 has limited frequency spectrum available for communications.

Contours of a spot beam 150 can be determined in part by the particular antenna design and can depend on factors, such as location of feed horn relative to a reflector, size of the reflector, type of feed horn, etc. Each spot beam's contour on the earth can generally have a conical shape (e.g., circular or elliptical), illuminating a spot beam 150 coverage area for both transmit and receive operations. A spot beam 150 can illuminate terminals that are on or above the earth surface (e.g., airborne terminals, etc.). In some embodiments, directional antennas are used to form fixed location spot beams (or spot beams that are associated with substantially the same spot beam coverage area over time). Certain embodiments of the satellite 105 operate in a multiple spot-beam mode, receiving and transmitting a number of signals in different spot beams. Each spot beam can use a single carrier (i.e., one carrier frequency), a contiguous frequency range (i.e., one or more carrier frequencies), or a number of frequency ranges (with one or more carrier frequencies in each frequency range). Some embodiments of the satellite 105 are non-regenerative, such that signal manipulation by the satellite 105 provides functions, such as frequency translation, polarization conversion, filtering, amplification, and the like, while omitting data demodulation and/or modulation and error correction decoding and/or encoding.

As used herein, the term spot beam 150 can generally refer to a geographic coverage area within a beam or the beams themselves. For example, in the same spot beam 150 area, embodiments of the satellites 105 can support one or more gateway uplink beams, gateway downlink beams, user uplink beams, user downlink beams, etc. For example, in a hub-spoke configuration, forward-channel traffic travels from a gateway terminal to a satellite 105 via a gateway uplink beam, and from the satellite 105 to a user terminal via a user downlink beam; and return-channel traffic travels from the user terminal to the satellite 105 via a user uplink beam, and from the satellite 105 to the gateway terminal via a gateway downlink beam. In some implementations, each spot beam 150 is serviced by a transponder and a fixed-focus antenna on the satellite 105, while each uplink and downlink beam is serviced by a feed on the satellite 105. In some implementations, the different beams use different geographic locations, carrier frequencies, polarizations, communications timing, and/or other techniques to avoid inter-beam interference.

A given beam can typically service many ground terminals 165. For example, a "user" beam can be used to service many user terminals, and a "gateway" beam can be used to service a gateway terminal and any users in the coverage are of the beam (though typically not at the same time). The various user beams and gateway beams can use the same, overlapping, or different frequencies, polarizations, etc. In some embodiments, some or all gateway terminals are located away from the user terminals, which can facilitate frequency re-use. In other embodiments, some user terminals are located near some or all gateway terminals. While the satellite communications system 100 can support very large numbers of ground terminals 165 via large numbers of spot beams 150, only two of each are shown for clarity.

As illustrated, a first ground terminal 165a communicates with a first satellite 105a via a first spot beam 150a, and a second ground terminal 165b communicates with a second satellite 105b via a second spot beam 150b. Each ground terminal 165 communicates according to synchronized satellite time slots. For example, each ground terminal 165 keeps track of its own path delay to its respective satellite 105 and synchronizes its communications to be received by its satellite according to slot boundaries of its respective satellite time slots. In one implementation, one or more ground terminals 165 communicates uplink synchronization beacon signals containing a pseudo noise (PN) code tied to the frame timing, which the satellites 105 can receive and use for synchronizing their switch timing, etc. (e.g., with appropriate offsets and/or delays). This can permit inter-satellite synchronization. The beacon signals can be re-radiated from the satellites to the ground effectively as downlink beacon signals containing the PN code tied to the frame timing of each satellite 105 (e.g., with a coverage area that includes all gateway locations).

Some or all of the gateway terminals can receive one or both beacon signals for use in synchronizing their communication timing according to both satellites 105 (e.g., the gateway terminals can synchronize respective receive timing by the PN code and advance transmit timing with respect to the receive timing by one round-trip delay). The gateway terminals can also measure their path delay to a satellite by receiving their own transmissions from the satellite during a loopback portion of each frame. For example, a transmit signal carrying user traffic can be sent during a designated time slot in each frame for loopback to avoid loopback overhead. Certain embodiments include gateway ranging signals for synchronization (e.g., and/or for uplink power control and the like).

As described herein, slot boundaries for one ground terminal 165 in one spot beam 150 can be offset from slot boundaries for another ground terminal 165 in another spot beam 150 to aid in interference management. In some implementations, synchronization of the satellite time slots is performed by a synchronization subsystem (e.g., in conjunction with synchronizing functionality of the gateways). As illustrated, communications from the first ground terminal 165a to the first satellite 105a experience a first path delay, and communications from the first ground terminal 165a to the second satellite 105b experience a second path delay, manifesting a difference between the path delays (a "path delay difference") illustrated as "$\Delta 1$." Similarly, communications from the second ground terminal 165b to the second satellite 105b experience a third path delay, and communications from the second ground terminal 165b to the first satellite 105a experience a fourth path delay, manifesting a path delay difference illustrated as "$\Delta 2$." Given the respective locations of the ground terminals 165 and the respective locations of the satellites 105, the path delay differences are typically different and change over time as the satellites 105 change position relative to the orbital slot 120 and to each other.

Various station keeping techniques and the like can be used to keep the two satellites 105 in the orbital slot 120 and within a maximum distance from each other. For example, station keeping components on the satellites 105 (e.g., sensors, thrusters, etc.) are used to keep the satellites 105 in their desired position relative to the Earth and relative to each other. In one embodiment, 0.05-degree station keeping is used. In some implementations, further station keeping (or other satellite positioning) is performed remotely from the ground, for example, at a network operations center (NOC) or the like.

Figure 2:
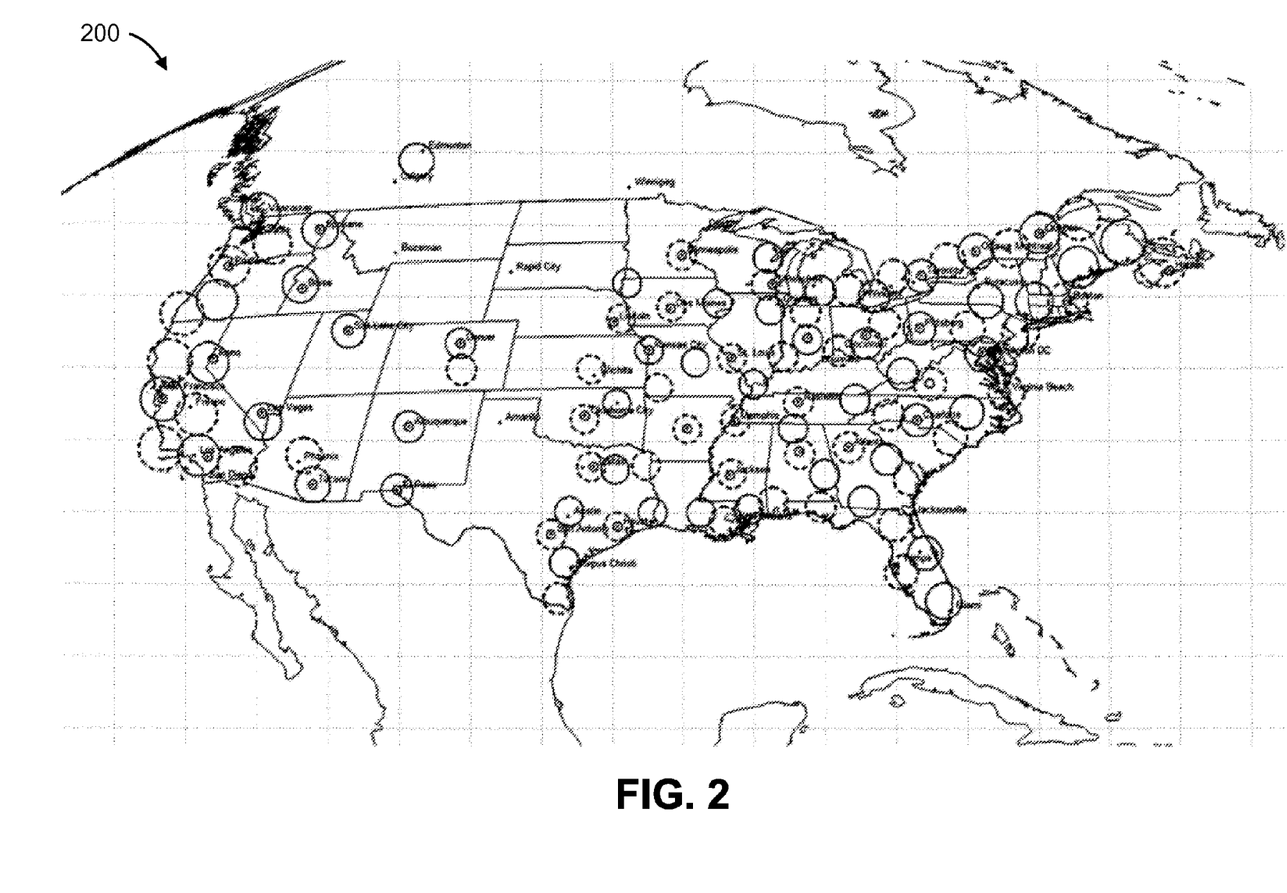
FIG. 2 shows an illustrative layout of spot beams to cover portions of North America.

Multiple spot beams 150 are used to facilitate communications between the satellites 105 and large geographic regions. For example, FIG. 2 shows an illustrative layout of spot beams 150 to cover portions of North America. Solid-bordered empty circles indicate spot beams serviced by satellite 1 and designated as user beams; dashed-bordered empty circles indicate spot beams serviced by satellite 2 and designated as user beams; solid-bordered "bulls-eyes" indicate spot beams serviced by satellite 1 and designated as gateway beams; and dashed-bordered bulls-eyes indicate spot beams serviced by satellite 2 and designated as gateway beams. In the illustrated implementation, the two satellites include 62 total transponders configured to service 102 total beams, including 36 gateway beams in the United States and four gateway beams in Canada.

In some implementations, the beams are switched according to a beam switching scheme. In one such implementation, each satellite switches among its beams in a pattern designed to minimize interference between beams, group certain beams with certain capabilities (e.g., to service high-priority beams with high-reliability gateway terminals), to provide robustness in case of limited gateway terminal outages, etc. To further reduce interference, spot beams can be assigned to satellites according to particular rules. For example, potentially inferring groups of spot beams are assigned to the same satellite to the extent practical so that potential beam conflicts can largely be addressed on a per satellite basis (e.g., most of the potential beam conflicts for a satellite are with other beams on that satellite, so that de-conflicting in those cases does not involve the other satellite).

Figure 3:
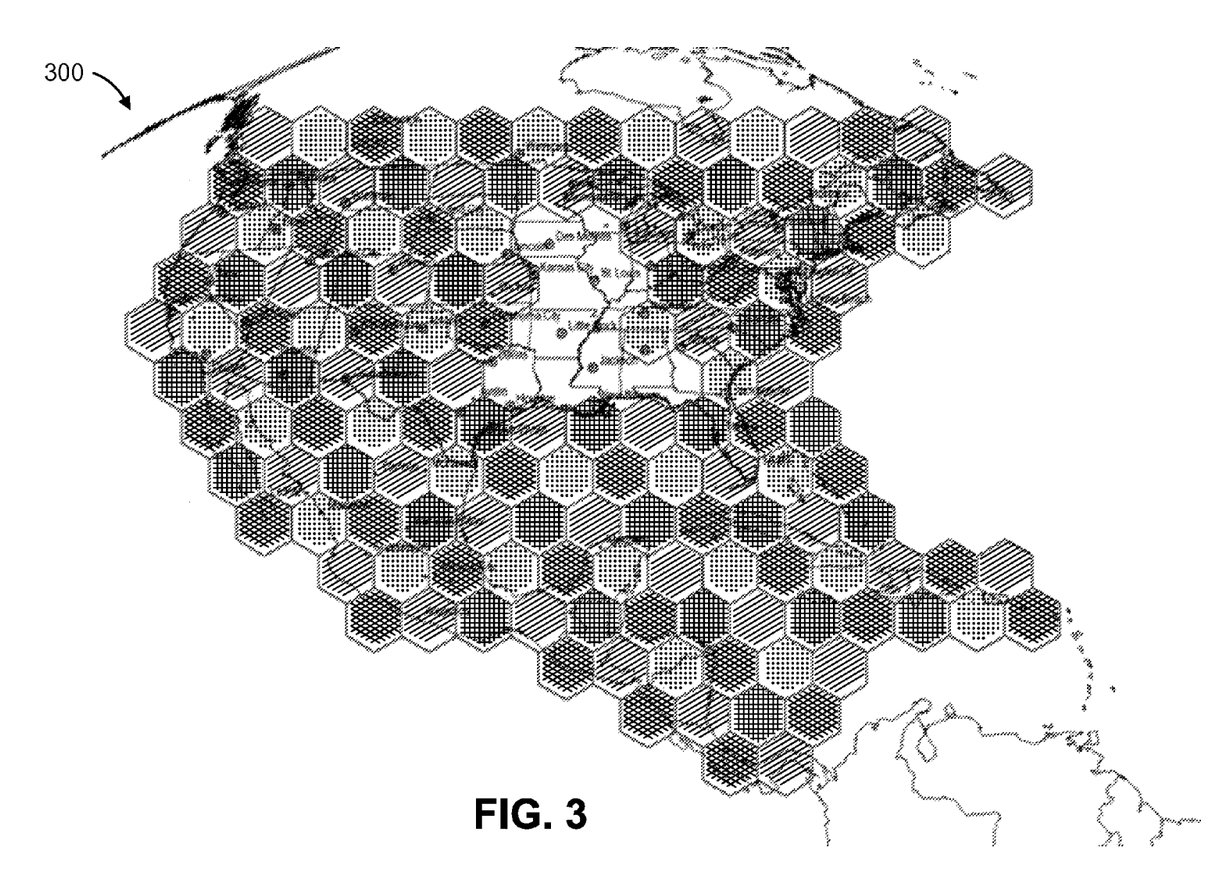
FIG. 3 shows another illustrative layout of spot beams to cover portions of North America as seen at a particular time.

FIG. 3 shows another illustrative layout of spot beams 150 to cover portions of North America as seen at a particular time. The illustrated implementation includes 144 larger beams serviced by eighteen transponders. Hexagons filled with diagonal lines indicate a first spot beam type (e.g., a particular frequency, polarization, etc.) serviced by satellite 1; hexagons filled with diagonal cross-hatches indicate a second spot beam type serviced by satellite 1; hexagons filled with dots indicate a first spot beam type serviced by satellite 2; and hexagons filled with non-diagonal cross-hatches indicate a second spot beam type serviced by satellite 2. Each spot beam is "colored" for each time slot in an attempt to reduce inter-beam interference. For example, for each spot beam of a particular type from a particular satellite, all its adjacent spot beams are either of the other type or from the other satellite. The illustrative layouts of FIGS. 2 and 3 are intended only to illustrate some of many different approaches for covering large geographic regions with many spot beams.

In one embodiment, two satellites (e.g., satellites 105 of FIG. 1) are configured to service both the small-beam coverage areas of FIG. 2 and the large-beam coverage areas of FIG. 3. For example, each satellite includes one 5.2-meter reflector with a 0.1-degree radius beam at boresight for servicing the 62 small beam transponders across the two satellites (e.g., 30 on one satellite and 32 on the other satellite), and each satellite has two 1.8-meter apertures with 0.3-degree radius beams at boresight for servicing the 18 large beam transponders across the two satellites (e.g., 10 on one satellite and 8 on the other satellite). For example, a first satellite has 30 small beam transponders and 10 large beam transponders, and a second satellite has 32 small beam transponders and 8 large beam transponders, so that each satellite has 40 total transponders. Each small beam transponder can service a small beam, so that the two satellites can service 102 small beams with the 62 total small beam transponders, including 62 user beams and 40 gateway beams (e.g., as illustrated in FIG. 2). Each large beam transponder can service eight large beams, so that the two satellites can service 144 large user beams with the 18 total large beam transponders (e.g., as illustrated in FIG. 3).

Various interference management approaches can be used by different embodiments. For example, some implementations limit potential gateway-to-gateway interference by locating the gateways far from each other. User-to-user interference can be mitigated by using one polarity for all user beams of one satellite and using another polarity for all user beams of the other satellite (though users in gateway beams could still experience interference issues in implementations where gateways use both polarities for communications). Still, in implementations using multiple polarities (e.g., two polarities) and a full range of spectrum for each polarity, there can be many opportunities for interference among adjacent and overlapping beams. Further complications can arise from the use of overlapping beams having different sizes and characteristics (e.g., as described above with a combined implementation of FIGS. 2 and 3). Some of these conflicts can be avoided through beam switching techniques (e.g., careful design of beam switching patterns) and/or by assigning potentially interfering beams to the same satellite. However, beam switching may not be able to de-conflict all potential issues, particularly when there are large numbers of potential conflicts; and certain motivations, like spatial flexibility, reflector assignment, routing, and the like can preclude or discourage certain beam assignment options.

Figure 4:
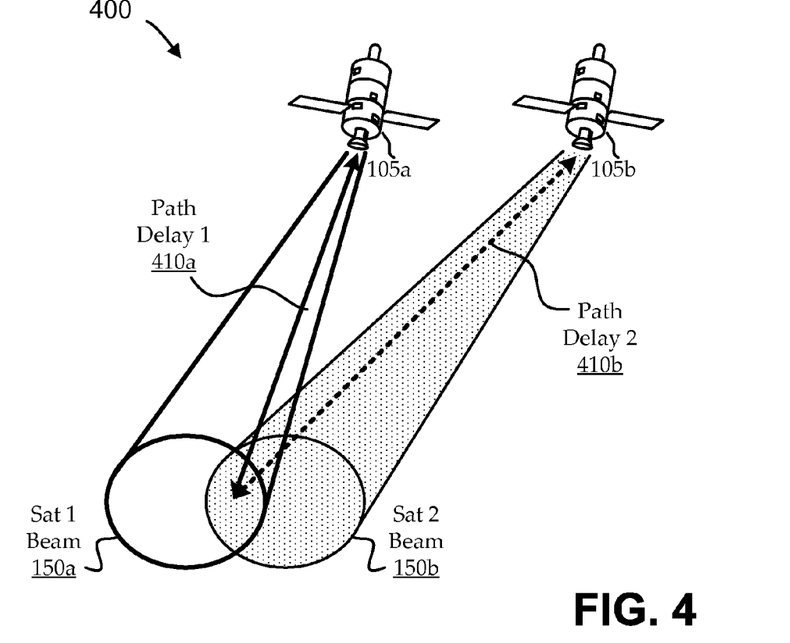
FIG. 4 shows a simplified view of two potentially interfering spot beams generated by two satellites in an orbital slot, according to various embodiments.

FIG. 4 shows a simplified view of two potentially interfering spot beams 150 generated by two satellites 105 in an orbital slot, according to various embodiments. The first satellite 105a facilitates first satellite communications for ground terminals in a first spot beam 150a according to first satellite time slots, and the second satellite 105b facilitates second satellite communications for ground terminals in a second spot beam 150b according to second satellite time slots. Because antennas associated with each ground terminal are pointing generally toward the orbital slot having both satellites 105, and the beams overlap; each ground terminal is effectively pointing at both satellites 105, and the satellites 105 can both potentially be pointing at ground terminals in both beams at the same time.

Suppose, for example, that the satellites 105 are both set during a portion of a time slot to receive uplink traffic on the same frequency and polarization at the same time on overlapping spot beams. Uplink communications by ground terminals at that frequency and polarization to the first satellite 105a can potentially interfere with other uplink communications by ground terminals at that frequency and polarization to the second satellite 105b, and vise versa. When these interfering uplink signals are sent as downlink traffic, the receiving ground terminals are potentially receiving the interfering signals. Further, when the interfering uplink signals are received at the satellites 105, components of the satellites 105 can potentially experience issues with power and the like. For example, input amplifiers (e.g., low noise amplifiers), output amplifiers (e.g., high-power amplifiers), and the like can be configured for certain power levels that can be impacted by concurrent receipt of interfering signals from multiple beams. In another example, suppose the satellites 105 receive uplink traffic from two non-conflicting beams, but they are both set during a portion of a time slot to transmit downlink traffic on conflicting beams (e.g., by communicating to overlapping beams on the same frequency and polarization at the same time). Again, interfering signals can potentially be received by ground terminals in overlapping portions of the conflicting beams. It is desirable, in some embodiments, to limit the times during which these types of potentially interfering conditions between the two satellites 105 can occur.

As described above, some implementations use geographic diversity, multiple carriers, multiple polarities, and/or other techniques to reduce interference between beams. Certain implementations further use beam switching schemes and beam assignments designed to group potentially interfering beams by satellite and to sequentially select spot beams to limit interference. Still, it can be impractical to completely eliminate all potential inter-beam interferences. Eliminating the potential inter-beam interference can be even more difficult in context of multiple satellites 105 that can move relative to one another.

The first and second satellites 105 maintain relative positions in an orbital slot using station keeping and/or other techniques. As illustrated, communications from ground terminals via the first spot beam 150a will experience a first path delay 410a with respect to the first satellite 105a. For example, the satellites 105 are in geosynchronous orbit over 22,000 miles away from the ground terminal antennas, so that there is a path delay of approximately 120 milliseconds for information to travel from the ground terminals to the satellites 105. The same communications from the ground terminals can also reach the second satellite 105b either slightly before or slightly after reaching the first satellite 105a, due to the relative positions of the two satellites 105. For example, as illustrated, the second satellite 105b is slightly farther from ground terminals in the first spot beam 150a, so that there is a second path delay 410b that is slightly larger than the first path delay 410a. The path delays 410 could be similarly stated with reference to ground terminals in the second spot beam 150b. As used herein, the absolute value of the difference between the first and second path delays 410 is referred to as the path delay difference. In some embodiments, station keeping and/or other techniques are used to ensure that the relative positions of the satellites 105 manifest less than or equal to a predetermined maximum path delay difference with respect to some or all ground terminals.

Figure 5:
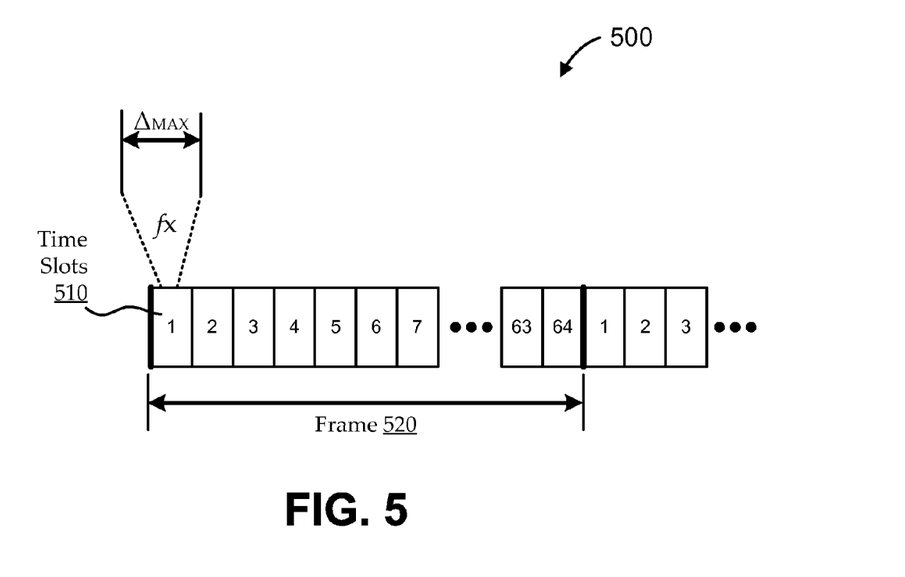
FIG. 5 illustrates a functional relationship between the path delay difference and slot timing for the satellite communications, according to various embodiments.

FIG. 5 illustrates a functional relationship between the path delay difference and slot timing for the satellite communications, according to various embodiments. For the sake of illustration, the first and second path delays (e.g., as shown in FIG. 4) result in a maximum (e.g., worst-case) path delay difference ("$\Delta_{MAX}$"). FIG. 5 also illustrates a sequence of time slots 510. Each time slot 510 begins and ends at a slot boundary and has a duration. Groups of time slots 510 can be considered as frames 520. Slot boundaries, durations, and/or other characteristics of slot timing can be governed by a synchronization system (like the synchronization system 170 of FIG. 1). In one implementation, each frame 520 includes 64 time slots 510. For example, beam switching schemes can be designed to repeat once per frame 520 and to switch beam configurations for the satellites once per time slot 510.

As illustrated, slot timing can be functionally related to the maximum path delay difference (e.g., the slot duration is at least twice the maximum path delay). In some embodiments, slot timing is a function of station keeping (and/or other satellite positioning). For example, station keeping functionality is designed on the satellites 105 to maintain the satellites to within about 90 miles of each other, which translates to a maximum path delay difference of approximately 500 microseconds. The time slots 510 can be designed to have durations of at least twice the maximum path delay difference, or at least approximately one millisecond. In other embodiments, station keeping is a function of slot timing. For example, a frame 520 is designed to last approximately twenty milliseconds and to have 64 time slots 510, so that each time slot 510 has a duration of approximately 312.5 microseconds. Considering this as at least twice the maximum path delay difference, station keeping is designed to maintain a maximum path delay difference of less than approximately 156 microseconds, or approximately 29 miles.

The slot timing and/or station keeping can be designed to be functionally related in any suitable manner and/or to satisfy other constraints. One such constraint is that it can be impractical to maintain relative satellite positions beyond a certain extent. Other such constraints include that beam switching schemes can have excessive latency with slot durations that are too long, that it can be difficult to create robust beam switching schemes with frames 520 that are too short, etc. Accordingly, it can be desirable to find compromises between slot timing and station keeping constraints that can impact functional relationships there-between. Embodiments exploit functional relationships between slot timing and satellite path delays to further reduce opportunities for inter-satellite, inter-beam interference.

Figure 6A:
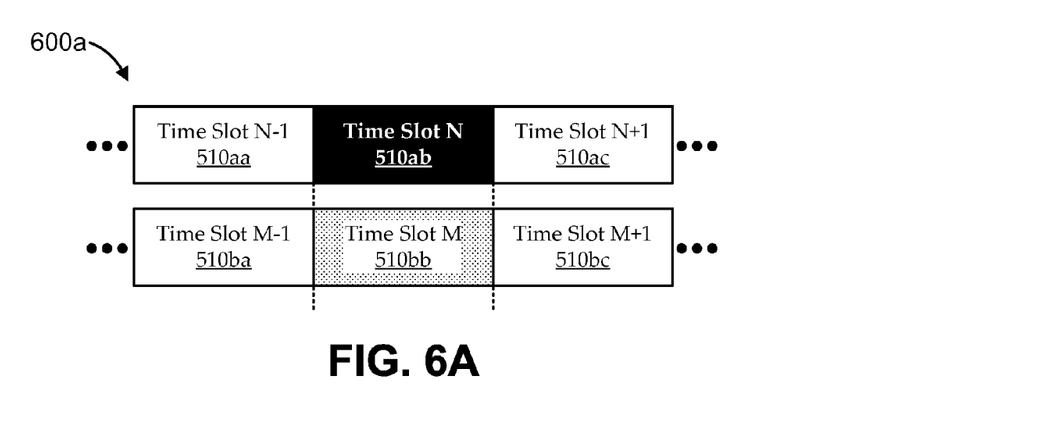
FIGS. 6A-6C show a first synchronization approach in which slot boundaries for first time slots are lined up with slot boundaries for second time slots.
Figure 6B:
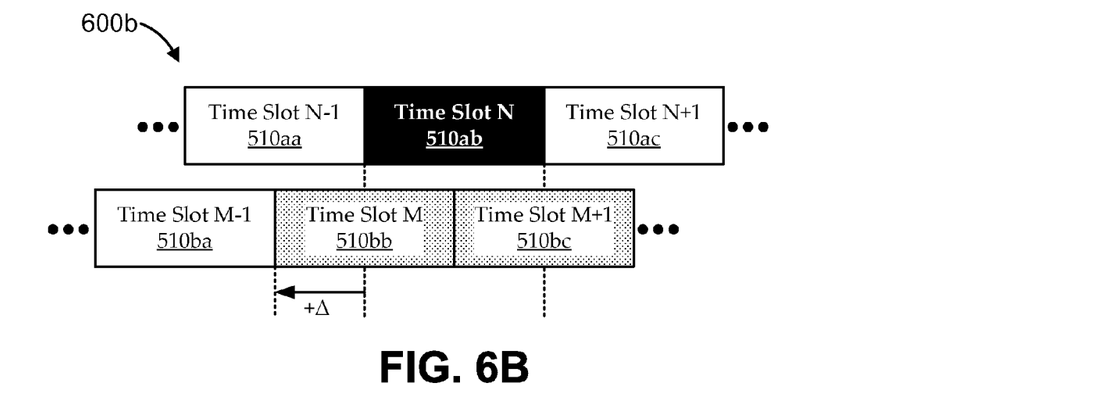
Figure 6C:
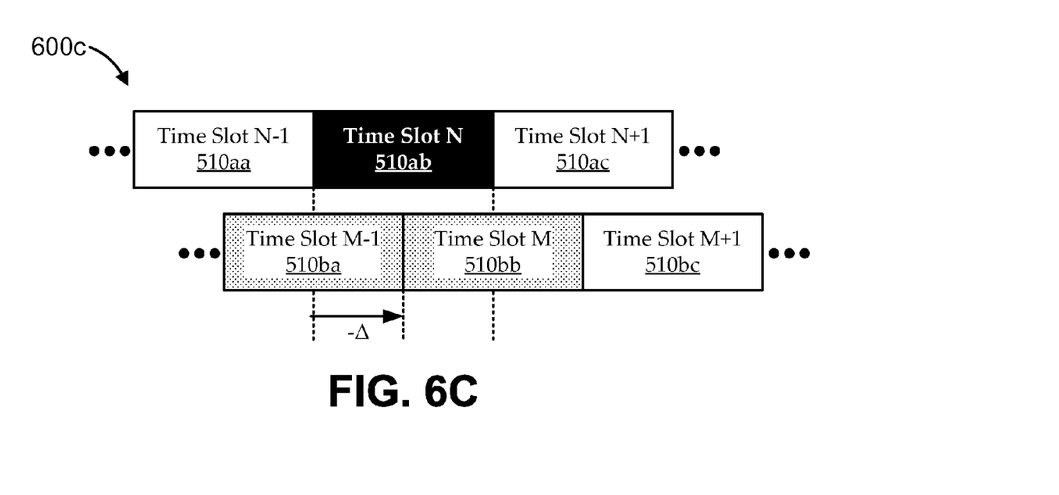

For the sake of illustrating certain functionality, FIGS. 6A-6C, 7A-7C, and 8A-8C show three different synchronization approaches and their impact on inter-satellite, inter-beam interference. Turning first to FIGS. 6A-6C, a first synchronization approach is illustrated in which slot boundaries for first time slots 510a are lined up with slot boundaries for second time slots 510b. It is assumed that a first ground terminal is communicating with a first satellite via a first spot beam according to the first time slots 510a, and a second ground terminal is communicating with a second satellite via a second spot beam according to the second time slots 510b. For the sake of clarity, the illustration focuses on the relationship between three first time slots 510a and three overlapping second time slots 510b.

FIG. 6A shows nominal slot timing according to the synchronization approach. Slot boundaries of Time Slot N−1 510aa, Time Slot N 510ab, and Time Slot N+1 510ac are lined up with slot boundaries of Time Slot M−1 510ba, Time Slot M 510bb, and Time Slot M+1 510bc, respectively. Suppose, for example, that a beam switching scheme of the first satellite selects first, second, and third spot beams by which to communicate during each of the three first time slots 510a, respectively; and a beam switching scheme of the second satellite selects fourth, fifth, and sixth spot beams by which to communicate during each of the three second time slots 510b, respectively. If Time Slot N 510ab can remain lined up with Time Slot M 510bb, the second satellite will be communicating via the fifth spot beam for the entire time that the first satellite will be communicating via the second spot beam. As such, inter-beam interference can be mitigated by ensuring (if practical) that the second and fifth spot beams are not potentially interfering (e.g., overlapping geographically, while also operating on substantially the same frequency and polarization). For example, if a ground terminal is communicating with satellite 1 via its selected second spot beam in its Time Slot N 510ab, it may be desirable to ensure that those communications will not interfere with other communications with satellite 2 via its selected fifth spot beam in its concurrent Time Slot M 510bb.

As described above, each ground terminal can experience path delay differences between the two satellites, and movement of the satellites relative to each other can affect those path delay differences. Accordingly, the nominal slot timing illustrated in FIG. 6A is unlikely to apply to any particular ground terminal. For example, if a ground terminal is communicating with the first satellite via the selected second spot beam during Time Slot N 510ab, the path delay difference for that ground terminal's communications with respect to the second satellite may effectively shift the slot boundaries for the second time slots 510b from its perspective. FIG. 6B illustrates worst-case shifting of the slot boundaries to occur earlier, and FIG. 6C illustrates worst-case shifting of the slot boundaries to occur later.

For example, in FIG. 6B, the second satellite is closer to the ground terminal than is the first satellite, and the difference between the satellites from the perspective of the ground terminal is the maximum path delay difference. The shifted timing causes Time Slot N 510ab to overlap with both Time Slot M 510bb and Time Slot M+1 510bc. Accordingly, during the time that the first satellite will be communicating via the second spot beam, the second satellite will be communicating via the fifth spot beam for part of the time and via the sixth spot beam for another part of the time. Avoiding inter-beam interference with the second spot beam can involve careful selection of both the fifth and sixth spot beams to avoid interference, or potentially stopping communications with the second satellite during either or both of Time Slot M 510bb and Time Slot M+1 510bc. Similarly, in FIG. 6C, the second satellite is farther from the ground terminal than is the first satellite, and the difference between the satellites from the perspective of the ground terminal is the maximum path delay difference. The shifted timing now causes Time Slot N 510ab to overlap with both Time Slot M−1 510ba and Time Slot M 510bb. Accordingly, during the time that the first satellite will be communicating via the second spot beam, the second satellite will be communicating via the fourth spot beam for part of the time and via the fifth spot beam for another part of the time. Because different ground terminals could experience relative slot timing that looks like any of FIGS. 6A-6C, inter-beam interference management may have to account for potentially interfering beams being selected in any of Time Slot M−1 510ba, Time Slot M 510bb, and Time Slot M+1 510bc.

The illustrative slot timing in FIGS. 6A-6C show the maximum path delay as approximately one half of a slot duration, so that the slot boundaries can shift relative to each other by up to a half slot duration. Because the nominal condition of FIG. 6A only works when the slot boundaries are substantially lined up, any relative shift in slot boundaries could manifest similar or identical issues to those discussed with reference to FIG. 6B or 6C. Accordingly, similar techniques are applicable to path delay differences and slot durations having different functional relationships.

Figure 7A:
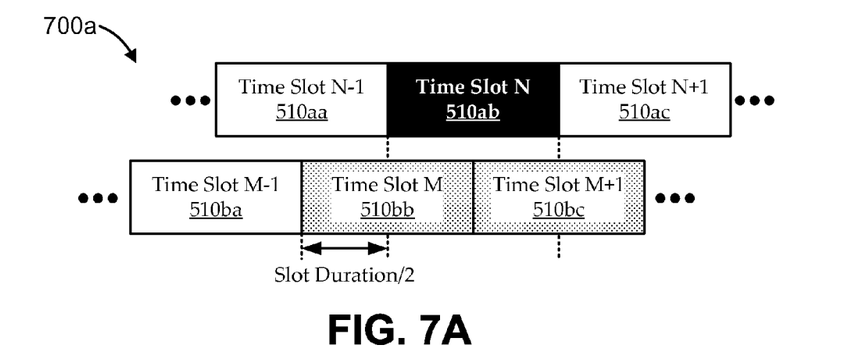
FIGS. 7A-7C show another synchronization approach in which slot boundaries for first time slots are offset with slot boundaries for second time slots.
Figure 7B:
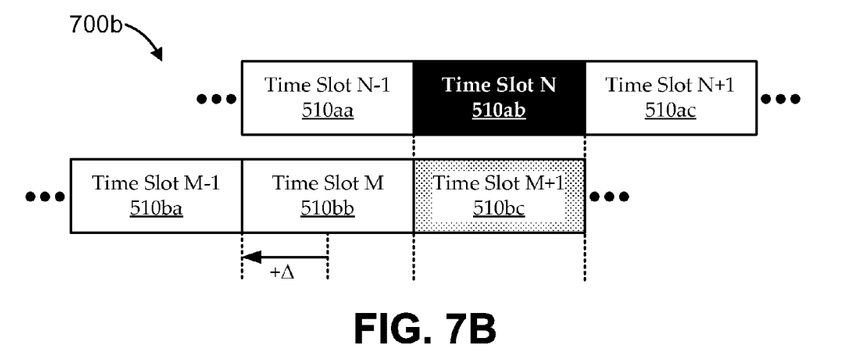
Figure 7C:
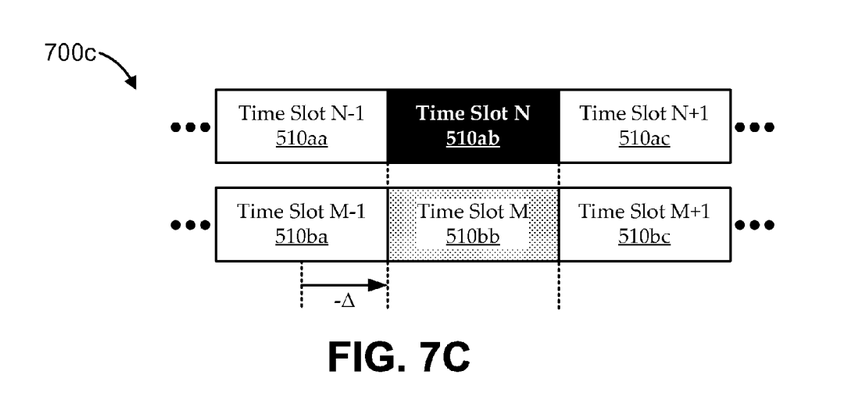

FIGS. 7A-7C show another synchronization approach in which slot boundaries for first time slots 510a are offset with slot boundaries for second time slots 510b. According to the nominal slot timing shown in FIG. 7A, slot boundaries of Time Slot N−1 510aa, Time Slot N 510ab, and Time Slot N+1 510ac are offset by one-half of a time slot relative to slot boundaries of Time Slot M−1 510ba, Time Slot M 5100bb, and Time Slot M+1 510bc, respectively. In the nominal case, Time Slot N 510ab overlaps with both Time Slot M 510bb and Time Slot M+1 510bc. Using the beam switching example discussed with reference to FIGS. 6A-6C, during the time that the first satellite will be communicating via the second spot beam, the second satellite will be communicating via the fifth spot beam for part of the time and via the sixth spot beam for another part of the time.

FIG. 7B illustrates worst-case shifting of the slot boundaries to occur earlier, and FIG. 7C illustrates worst-case shifting of the slot boundaries to occur later. For example, in FIG. 7B, the second satellite is closer to the ground terminal than is the first satellite, and the difference between the satellites from the perspective of the ground terminal is the maximum path delay difference. It is assumed that the slot duration is slightly greater than approximately twice the maximum path delay difference, so that offsetting the slot boundaries by one half of a slot duration approximately corresponds to offsetting the slot boundaries by the maximum path delay difference. As shown in the worst-case early condition of FIG. 7B, the shifted timing from the perspective of the ground terminal manifests as overlap between Time Slot N 510ab and only Time Slot M+1 510bc. As shown in the worst-case late condition of FIG. 7C, the shifted timing from the perspective of the ground terminal manifests as overlap between Time Slot N 510ab and only Time Slot M 510bb.

Different ground terminals could experience relative slot timing that looks like any of FIGS. 7A-7C. However, by offsetting the nominal timing by one-half of a time slot 510, Time Slot N 510ab never overlaps with Time Slot M−1 510ba. As such, inter-beam interference management may have to account for potentially interfering beams being selected in only Time Slot M 510bb and Time Slot M+1 510bc.

Figure 8A:
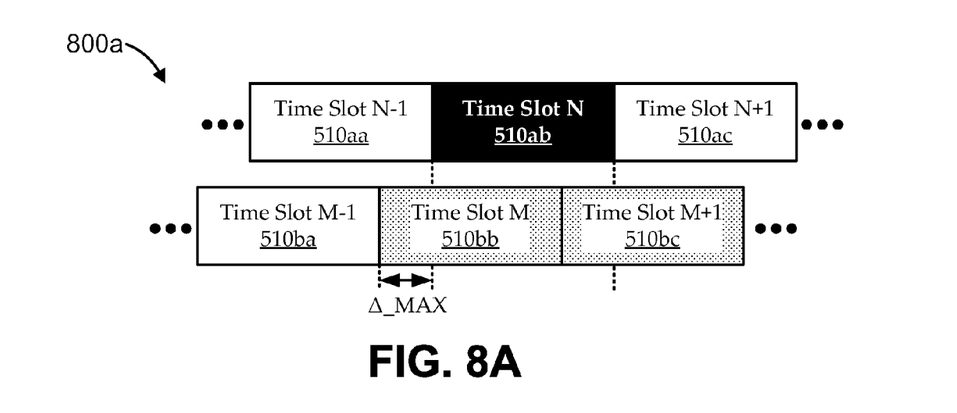
FIGS. 8A-8C show yet another synchronization approach in which slot boundaries for first time slots are offset with slot boundaries for second time slots.
Figure 8B:
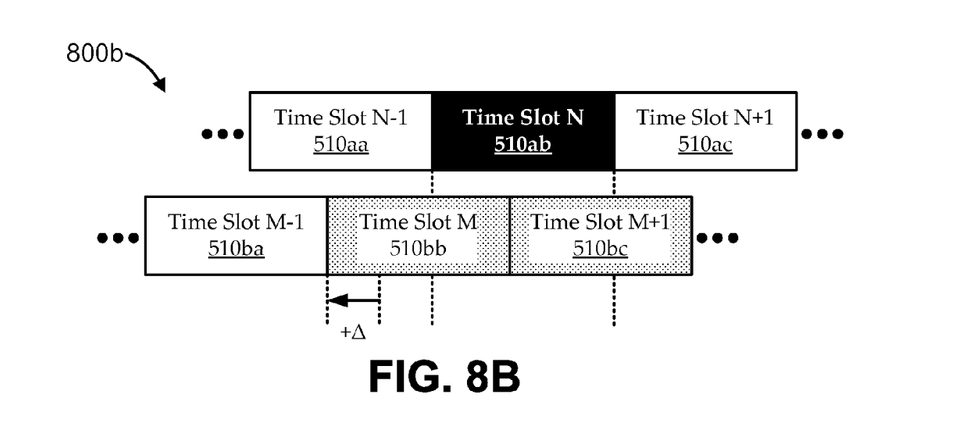
Figure 8C:
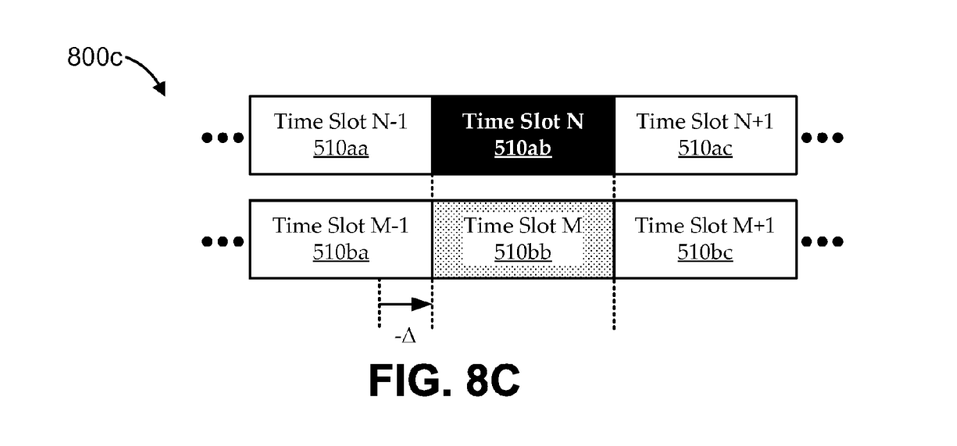

FIGS. 8A-8C show yet another synchronization approach in which slot boundaries for first time slots 510a are offset with slot boundaries for second time slots 510b. According to the nominal slot timing shown in FIG. 5A, slot boundaries of Time Slot N−1 510*aa*, Time Slot N 510*ab*, and Time Slot N+1 510*ac* are offset relative to slot boundaries of Time Slot M−1 510*ba*, Time Slot M 510*bb*, and Time Slot M+1 510*bc*, respectively. The offset in FIG. 8A is approximately the maximum path delay difference, assuming the maximum path delay difference is any amount less than one half of a slot duration. For example, station keeping techniques are used to keep the satellites to within 10 miles of each other, so that the maximum path delay difference (and the slot boundary offset) is approximately 54 microseconds. The operation of FIGS. 8A-8C yield substantially the same functionality as described with reference to FIGS. 7A-7C. For example, in the nominal case, Time Slot N 510*ab* overlaps with both Time Slot M 510*bb* and Time Slot M+1 510*bc*. In the worst-case early condition of FIG. 8B, the shifted timing from the perspective of the ground terminal manifests as overlap between Time Slot N 510*ab* and only Time Slot M+1 510*bc*; and in the worst-case late condition of FIG. 5C, the shifted timing from the perspective of the ground terminal manifests as overlap between Time Slot N 510 ab and only Time Slot M 5100*bb*. Again, Time Slot N 510*ab* never overlaps with Time Slot M−1 510*ba*, and inter-beam interference management may have to account for potentially interfering beams being selected in only Time Slot M 510*bb* and Time Slot M+1 510*bc*.

Figure 9:
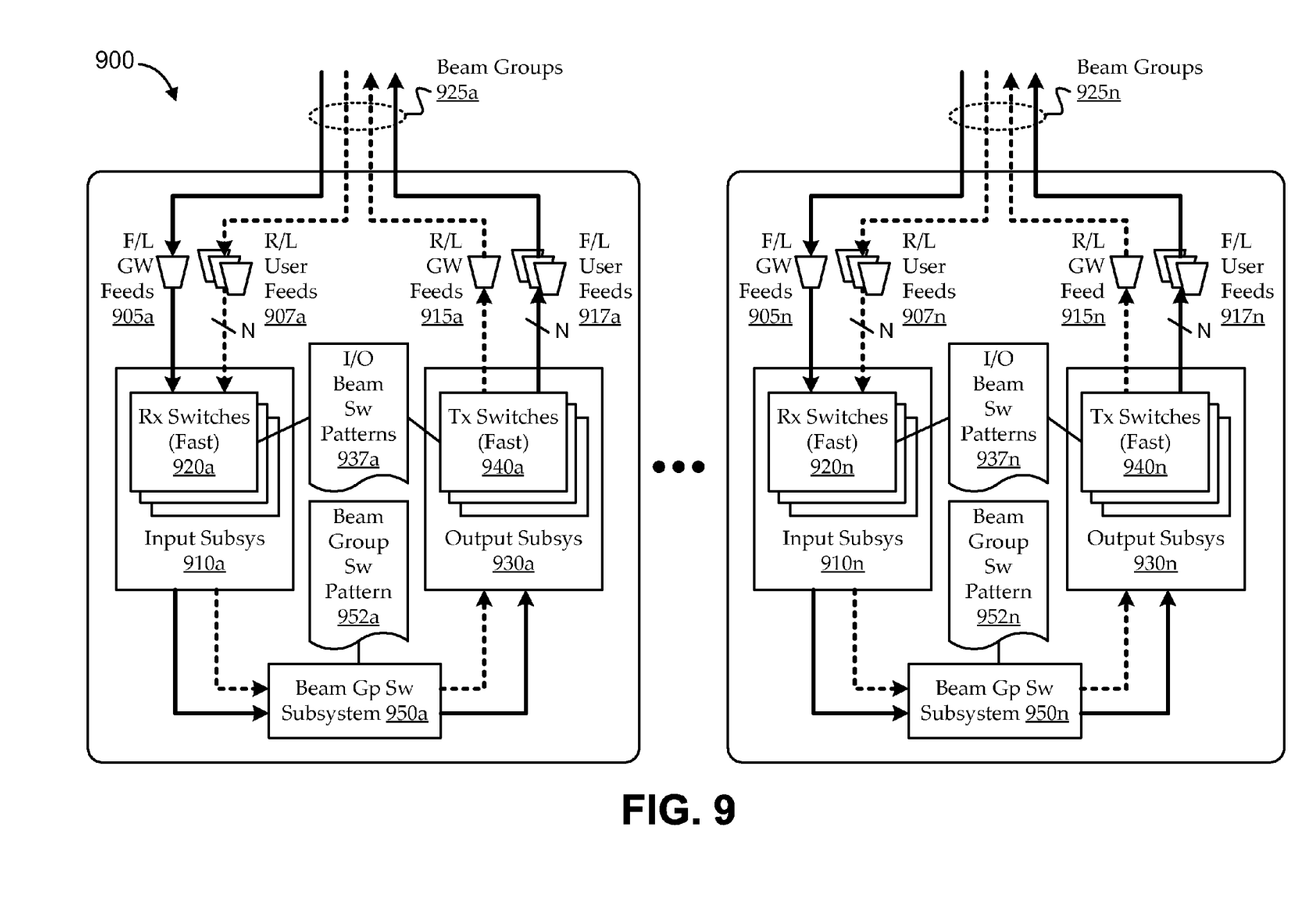
FIG. 9 shows a block diagram of an illustrative satellite configuration having multiple beam switching functions, according to various embodiments.

FIG. 9 shows a block diagram of an illustrative satellite configuration 900 having multiple beam switching functions, according to various embodiments. The satellite configuration 900 can represent an embodiment of satellite 105 described herein. As shown, the satellite configuration 900 includes a number of beam group switching subsystems 950. Each beam group switching subsystem 950 has associated input subsystems 910 and output subsystems 930. In the illustrated embodiment, each input system 910 includes one or more receive switches 920, and each output subsystem 930 includes one or more transmit switches 940 that can facilitate switching between user and/or gateway feeds. Designations, like "user beam," "user feed," "gateway beam," or "gateway feed" are included for added clarity, but are not intended to be limiting. For example, some implementations allow user terminals to communicate over gateway beams. In some embodiments, some or all of the input subsystems 910 are implemented without receive switches 920 and/or some or all of the output subsystems 930 are implemented without transmit switches 940. In certain implementations, each feed is coupled with an input or output port of a beam group switching subsystem 950, so that the beam group switching subsystem 950 can effectively couple input feeds with output feeds without additional beam switching.

Though not shown, the input systems 910 and/or output subsystems 930 can also include any other supporting functionality, including, for example, amplifiers, converters, filters, etc. In one implementation, each input subsystem 910 includes a low-noise amplifier (LNA), and each output subsystem 930 includes a high-power amplifier (HPA) (e.g., a traveling wave tube amplifier (TWTA)). In some embodiments, the receive switches 920 and/or transmit switches 940 are implemented as "fast" switches (e.g., capable of switching rapidly relative to frames). Implementations of the switches operate at radio frequency (RF) such as Ka band frequencies. In some embodiments, ferrite switches are used for the switches, which can provide fast switching, low insertion loss (e.g., do not substantially impact equivalent isotropically radiated power (EIRP) or gain-to-noise-temperature (G/T)), high power handling capabilities, etc.

The illustrated configuration includes multiple levels of terminal grouping. At a first level, ground terminals 165 communicate over input and output beams corresponding to feeds. For example, each "user feed" 907/917 supports communications for a number of user terminals. At a second level, the input and output beams (and respective feeds) can be grouped into spot beams (e.g., spot beams 150 described above). For example, each spot beam can support multiple feeds at different frequencies (e.g., separate uplink and downlink frequencies) and/or polarizations. At a third level, beams can be grouped into beam groups. For example, each input subsystem 910 and/or output subsystem 930 can have respective receive switches 920 and/or transmit switches 940 that can switch between beams in an associated beam group (e.g., according to input/output (I/O) beam switching patterns 937). At a fourth level, beam groups can themselves be grouped by associated beam group switching subsystems 950 (e.g., into "sets of beam groups" or "matrix switch groups"). Further, as illustrated, a single satellite 105 can have multiple beam group switching subsystems 950, each associated with its own set of beam groups 925. Even further, the satellite configuration 900 can include one or multiple satellites (e.g., in the same orbital slot, as described herein). Some of these groupings are not explicitly illustrated for the sake of clarity. For example, while forward-link gateway feed 905*a* is illustrated by a single arrow, the forward-link gateway feed 905*a* can represent (for a given communication) a particular feed of a particular beam of a particular beam group of a particular set of beam groups 925 serviced by one of the particular input subsystems 910*a* of a particular beam group switching subsystem 950*a*.

For the sake of clarity, forward pathways (e.g., for forward-link communications) are illustrated by solid arrows, and return pathways (e.g., for return-link communications) are illustrated by dashed arrows. For example, a forward-channel uplink signal is received via a forward-link gateway feed 905*a* at a first of the input subsystems 910*a* of a first beam group switching subsystem 950*a* (e.g., a receive switch 920 associated with the input subsystem 910*a* is switched to receive from the forward-link gateway feed 905*a* according to the I/O beam switching pattern 937 corresponding to the present time slot). The traffic from the forward-channel uplink signal is routed to a particular one of the output subsystems 930*a* of the beam group switching subsystem 950*a* according to the beam group switching pattern 952 corresponding to the present time slot. The signal (now a forward channel downlink signal) is routed to one of N forward-link user feeds 917*a* corresponding to one of the beams of the beam group associated with the particular one of the output subsystems 930*a* (e.g., a transmit switch 940 associated with the particular output subsystem 930*a* is switched to transmit over the forward-link user feed 917*a* according to the I/O beam switching pattern 937 corresponding to the present time slot).

Similarly, at a next slot, a return-channel uplink signal is received via a return-link user feed 907*a* at a first of the input subsystems 910*a* of a first beam group switching subsystem 950*a* (e.g., the receive switch 920 associated with the input subsystem 910*a* is switched to receive from the return-link user feed 907*a* according to the I/O beam switching pattern 937 corresponding to the next time slot). The traffic from the return-channel uplink signal is routed to a particular one of the output subsystems 930*a* of the beam group switching subsystem 950*a* according to the beam group switching pattern 952 corresponding to the next slot. The signal (now a return-channel downlink signal) is routed to one of N return-link gateway feeds 915*a* corresponding to one of the beams of the beam group associated with the particular one of the output subsystems 930*a* (e.g., a transmit switch 940 associated with the particular output subsystem 930*a* is switched to transmit over the return-link gateway feed 915*a* according to the I/O beam switching pattern 937 corresponding to the next time slot).

Typically, each of the I/O beam switching pattern 937 and the beam group switching pattern 952 defines a certain configuration at each slot of each frame, and the slot boundaries of the switching patterns are synchronized (e.g., lined up). For example, the I/O beam switching pattern 937 and the beam group switching pattern 953 each repeats for each frame of time slots. The I/O beam switching pattern 937 can define which input and output beams of its respective beam groups to use for communications during each time slot of its frame. The beam group switching pattern 952 can define which input subsystems 910 to communicatively couple with each output subsystem 930 during each time slot of its frame. While certain functionality is described in context of the satellite 105 (e.g., satellite configuration 900), some of the functionality involves coordination between the satellite 105 and one or more ground terminals 165 (e.g., gateway terminals, core nodes, synchronization system 170, and/or other ground systems).

The systems described above can perform various methods. In one illustrative method, first satellite communications are synchronized by a first ground terminal (e.g., a first gateway terminal) via a first satellite 105*a* in an orbital slot according to first satellite time slots. Second satellite communications can be synchronized by a second ground terminal (e.g., a second gateway terminal) via a second satellite 105*b* in the same orbital slot according to second satellite time slots. As described above, the first satellite time slots can be synchronized to be offset with respect to the second satellite time slots as a function of a maximum path delay difference between first and second path delays (i.e., where the first path delay is between the first ground terminal and the first satellite, and the second path delay is between the first ground terminal and the second satellite). For example, the first satellite time slots are synchronized to be offset with respect to the second satellite time slots by approximately the maximum path delay difference (e.g., as illustrated in FIGS. 8A-8C). In other embodiments, a duration is defined for each of the first and second satellite time slots as approximately twice the maximum path delay difference. In some such embodiments, the first satellite time slots are synchronized to be offset with respect to the second satellite time slots by approximately one-half of the duration (e.g., as illustrated in FIGS. 7A-7C).

For the sake of illustration, first ground terminals communicate (e.g., a first gateway terminal and a first group of user terminals), during a time slot N of the first satellite time slots, via the first satellite using first spot beams selected according to a beam switching scheme (e.g., according to a present configuration of an appropriate I/O beam switching pattern 937 and beam group switching pattern 952). During a time slot N+1 of the first satellite time slots, second ground terminals communicate (e.g., the same or different gateway terminal with the same or different user terminals) via the first satellite using second spot beams selected according to the beam switching scheme. During a time slot M of the second satellite time slots, third ground terminals communicate via the second satellite using third spot beams selected according to the beam switching scheme. A first portion of time slot M overlaps with time slot N so that the first and third spot beams experience first interference levels during the first portion of time slot M, and a second portion of time slot M overlaps with time slot N+1 so that the second and third spot beams experience second interference levels during the second portion of time slot M. With the overlapping time slots and the beam switching occurring concurrently, interference levels can change during a time slot. For example, near the middle of a time slot, the signal-to-noise ratio (SNR) for a beam on one satellite can appreciably change when an overlapping and interfering beam is switched into use by the other satellite.

In some embodiments, the beam switching scheme can be generated to select pairs of ground terminals to communicate via the satellites during each of the first and second satellite time slots in such a way that limits selection of potentially interfering spot beams on the first and second satellites during overlapping first and second satellite time slots. Other embodiments can predict whether any of the third spot beams potentially interferes with any of the first or second spot beams during time slot M according to the beam switching scheme. If so, embodiments can avoid communicating via the potentially interfering third spot beams during time slot M. As illustrated by comparing FIGS. 6A-6C with either of FIGS. 7A-7C or FIGS. 8A-8C, offsetting the frames in a manner that is functionally related to the maximum path delay difference can reduce the number of frames in which conflicts are predicted to occur.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A satellite communications system comprising:
   a first satellite configured to relay first satellite communications for first ground terminals, the first communications synchronized according to first satellite time slots;
   a second satellite configured to relay second satellite communications for second ground terminals, the second satellite communications synchronized according to second satellite time slots,
   the first and second satellites configured to maintain relative positions in a single orbital slot such that there is a maximum path delay difference between first and second path delays, the first path delay being between the first ground terminals and the first satellite, and the second path delay being between the first ground terminals and the second satellite; and
   a synchronization system configured to offset the first satellite time slots from the second satellite time slots as a function of the maximum path delay difference with respect to the first satellite time slots being lined up with the second satellite time slots.

2. The system of claim 1, wherein the synchronization system is configured to offset the first satellite time slots from the second satellite time slots by approximately the maximum path delay difference.

3. The system of claim 1, wherein the synchronization system is further configured to define a duration for each of the first and second time slots as at least twice the maximum path delay difference.

4. The system of claim 1, wherein: the synchronization system is further configured to define a duration for each of the first and second time slots according to the maximum path delay difference; and
   the synchronization system is configured to offset the first satellite time slots from the second satellite time slots by approximately one-half of the duration.

5. The system of claim 1, wherein the first and second satellites are configured to maintain relative positions in the single orbital slot such that there is the maximum path delay difference defined according to timing of the first and second satellite time slots.

6. The system of claim 1, wherein each satellite communicates with its respective ground terminals via a respective plurality of spot beams according to a beam switching scheme.

7. The system of claim 6, wherein the beam switching scheme selects spot beams to communicate via the satellites during each of the first and second satellite time slots in such a way as to limit selection of potentially interfering spot beams on the first and second satellites during overlapping first and second satellite time slots.

8. The system of claim 6, wherein:
   the first satellite communications via the first satellite uses first spot beams selected according to the beam switching scheme during a time slot N of the first satellite time slots;
   the first satellite communications via the first satellite uses second spot beams selected according to the beam switching scheme during a time slot N+1 of the first satellite time slots; and
   the second satellite communications via the second satellite uses third spot beams selected according to the beam switching scheme during a time slot M of the second satellite time slots,
   wherein a first portion of time slot M overlaps with time slot N so that the first and third spot beams experience first interference levels during the first portion of time slot M, and a second portion of time slot M overlaps with time slot N+1 so that the second and third spot beams experience second interference levels during the second portion of time slot M.

9. The system of claim 8, wherein the synchronization system operates to reduce the impact of potentially interfering spot beams from the satellites on the first and second interference levels at least by:
   predicting whether any of the third spot beams potentially interferes with any of the first or second respective spot beams during time slot M according to the beam switching scheme; and
   avoiding communicating via the potentially interfering third spot beams during time slot M.

10. The system of claim 1, wherein the first ground terminals comprises at least one gateway terminal and a plurality of user terminals in communication via a hub-spoke communications architecture.

11. The system of claim 1, wherein: each ground terminal is configured to communicate with one of the first or second satellites, to calculate its path delay to its respective satellite, and to synchronize its communications with its respective satellite so that a communication associated with a particular satellite time slot is received by its respective satellite at a slot boundary of the particular satellite time slot.

12. The system of claim 1, wherein the synchronization system comprises:
   a core node in communication with at least one gateway terminal of the first ground terminals and at least one gateway terminal of the second ground terminals and configured to synchronize the first and second satellite communications via the gateway terminals.

13. The system of claim 1, wherein each of the first and second satellites is a bent pipe satellite.

14. A method for synchronizing communications via first and second satellites in an orbital slot, the method comprising: synchronizing first satellite communications by a first ground terminal via the first satellite in the orbital slot according to first satellite time slots;
synchronizing second satellite communications by a second ground terminal via the second satellite in the orbital slot according to second satellite time slots;
maintaining relative positions of the satellites with station keeping such that there is the maximum path delay difference defined according to timing of the first and second satellite time slots;
and synchronizing the first satellite time slots to be offset with respect to the second satellite time slots as a function of a maximum path delay difference between first and second path delays with respect to the first satellite time slots being lined up with the second satellite time slots, the first path delay being between the first ground terminal and the first satellite, and the second path delay being between the first ground terminal and the second satellite.

15. The method of claim 14, wherein the first satellite time slots are synchronized to be offset with respect to the second satellite time slots by approximately the maximum path delay difference.

16. The method of claim 14, further comprising:
defining a duration for each of the first and second satellite time slots as approximately twice the maximum path delay difference.

17. The method of claim 14, further comprising:
defining a duration for each of the first and second satellite time slots according to the maximum path delay difference; and
synchronizing the first satellite time slots to be offset with respect to the second satellite time slots by approximately one-half of the duration.

18. The method of claim 14, further comprising: selecting a first plurality of ground terminals that comprises the first ground terminal to communicate via the first satellite and selecting a second plurality of ground terminals that comprises the second ground terminal to communicate via the second satellite so as to group potentially interfering spot beams by satellite.

19. The method of claim 14, further comprising:
communicating, during a time slot N of the first satellite time slots, via the first satellite using first spot beams selected according to a beam switching scheme;
communicating, during a time slot N+1 of the first satellite time slots, via the first satellite using second spot beams selected according to the beam switching scheme; and
communicating, during a time slot M of the second satellite time slots, via the second satellite using third spot beams selected according to the beam switching scheme,
wherein a first portion of time slot M overlaps with time slot N so that the first and third spot beams experience first interference levels during the first portion of time slot M, and a second portion of time slot M overlaps with time slot N+1 so that the second and third spot beams experience second interference levels during the second portion of time slot M.

20. The method of claim 19, further comprising: generating the beam switching scheme to select pairs of ground terminals to communicate via the satellites during each of the first and second satellite time slots in such a way that limits selection of potentially interfering spot beams on the first and second satellites during overlapping first and second satellite time slots.

21. The method of claim 19, further comprising:
predicting whether any of the third spot beams potentially interferes with any of the first or second spot beams during time slot M according to the beam switching scheme; and
avoiding communicating via the potentially interfering third spot beams during time slot M.

* * * * *